3,294,646
MICROBIOLOGICAL HYDROXYLATION OF NOR-
STEROIDS USING *ASPERGILLUS OCHRACEUS*
Leland L. Smith, Paoli, George Greenspan, Narberth, and
Richard Rees, Newtown Square, Pa., assignors to American Home Products Corporation, New York, N.Y., a corporation of Delaware
No Drawing. Filed Oct. 23, 1963, Ser. No. 318,154
10 Claims. (Cl. 195—51)

This invention relates to the oxidation of steroids and more particularly relates to the microbiological hydroxylation of 19-nor steroids.

According to the method of the present invention, it has now been found possible to hydroxylate specific positions of steroids of the 19-nor series by subjecting the same to the biological activity of a selected microorganism species.

The fermentative action of the selected species of microorganism of the present invention, namely *Aspergillus ochraceus* (hereinafter referred to as *A. ochraceus*), makes possible the production of hydroxylated 19-nortestosterones from sources not previously available for the production of such hydroxylated compounds. In addition, the present invention quite advantageously, but unexpectedly, provides a method for resolving racemic mixtures of 19-nortestosterones into products which are particularly useful for their hormonal activity. The resolved 19-nortestosterone steroids obtained are characterized in possessing either *d*- (natural) or *l*- (unnatural) configuration, and are therefore of increased value over the racemic mixtures from which they are obtained.

The new method of the present invention considering it in its broadest aspect and the products obtainable thereby are illustratively represented by the following reaction sequence:

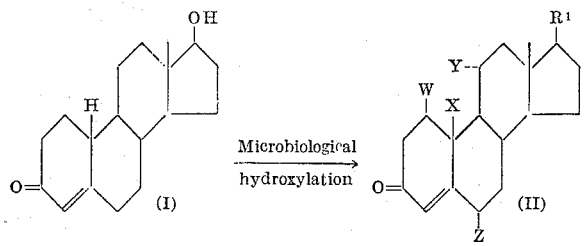

wherein R¹ is selected from the group consisting of OH and =O (keto) and one of W, X, Y and Z is OH and the remainder of this group is H, with the proviso that when W or X is OH, the representation of structure of the product is the mirror image of II.

As is evident by reference to Formula II above, the products of the present invention are characterized in that they are hydroxylated by the action of *A. ochraceus*, according to the method of the present invention, in the 1β-, 6β-, 10β- or 11α-positions. It is of course understood with respect to the products encompassed within those defined by Formula II that only one of W, X, Y or Z will be hydroxylated in a single product species. Under these circumstances the remaining positions at 1, 6, 10 or 11, depending on the particular position to which the hydroxyl group is attached, will all be hydrogenated. It is to be further understood, however, that during the fermentation by the microorganism, hydroxylation is being accomplished simultaneously at the various positions identified, thus giving rise in the product mixture of the various hydroxylated species identified, namely the 1β-, 6β-, 10β- or 11α-hydroxy nortestosterones.

While, as has been suggested, hydroxylation is being accomplished simultaneously at more than one position of the steroid starting material, hydroxylation at a particular position in terms of the quantity of that product obtained from the reaction mixture occurs in varying degrees as will be evident in the examples which follow. It has generally been found that when the starting steroid (I) is a racemic mixture the amounts of 10β and 11α product obtained are greater in quantity than the amounts of 1β and 6β product obtained.

As has previously been described, one of the important aspects of the present invention in addition to providing a means for obtaining hydroxylated 19-nortestosterones of specific structure from sources not previously utilizable for such production, the present invention also quite advantageously provides a method of resolving racemic mixtures of 19-nortestosterones thereby making possible the recovery of resolved 19-nortestosterones of particular configuration. Specifically it has been found that treating a racemic mixture of the steroids encompassed within the structure of I above with *A. ochraceus* results in the production of *l*-1β,17β- and *l*-10β,17β-dihydroxyestr-4-en-3-one of unnatural (*l*-) configuration. There is also produced 11α,17β-dihydroxyestr-4-en-3-one having a *d*- or natural configuration. In this series, it is believed that the 6β,17β-dihydroxyestr-4-en-3-one product obtained, is also of the *d*- or natural configuration. The limited amount of product available for analysis, however, limited the ability to determine positively the configuration of this particular product.

One further aspect of the present invention should receive attention. It has been found that if the starting material encompassed with Formula I above is *d*-19-nortestosterone, treatment with *A. ochraceus* according to the method of the present invention results in the production of both an 11α-hydroxy-19-nortestosterone and 11α-hydroxyestr-4-ene-3,17-dione. Examples of this aspect are presented hereinafter.

The steroid compounds encompassed within those defined by Formula II are, as has been described, useful for their hormonal properties; and, when it is contemplated that they be used for this purpose, these compounds are conveniently employed in combination with compatible and therapeutically administrable carriers, diluents, excipients and the like. Suitable liquid carriers include lower alcohols, polyalcohols such as glycol, mineral oil and the like. Additionally, conventional carriers such as methylcellulose, carboxymethylcellulose, starch, sugar and the like can be used. The compositions may, of course, be used in liquid, powder or tablet form as desired. The amount of the steroid administered for the purposes defined may vary, depending on the requirements, but will normally be administered in an amount of from about 0.5 to about 200 mg./kilo of body weight.

As has been suggested, the fermentative oxidation process of the present invention utilized a microorganism of the type *A. ochraceus*, such as for example NRRL 405. The foregoing microorganisms are obtainable from known sources such as the Northern Regional Research Laboratories, Peoria, Illinois. The microorganisms are, of course, also obtainable by isolating the same from natural sources by standard microbiological techniques.

In carrying out the process of the present invention, aerobic conditions are maintained in the presence of a suitable nutrient medium in temperatures in the range of from about 15° C. to about 37° C. in the presence of the fungal species referred to. The reaction to prepare a given quantity of the hydroxy steroid is normally complete within a period of from within a few hours to about 80 hours. During the growth of the organism under suitable conditions in the presence of a steroid, hydroxylation takes place in the positions previously described.

The *A. ochraceus* microorganism used can be grown on a dextrose, peptone, corn steep liquor, salts medium at a temperature of about 28° C. for a period of about 64 hours. Suitable nutrient media which may also be used include a yeast extract-dextrose medium or a malt extract-yeast extract-dextrose medium. Other suitable media which contain the necessary carbon, nitrogen and mineral elements, in the form of carbon include sugars such as glucose, sucrose, maltose, xylose, galactose and so forth; alcohols such as glycerol or mannitol; organic acids such as citric acid, maleic acid, acetic acid and various other natural products containing carbohydrates such as corn starch, corn steep liquor, soya bean meal, cotton seed meal and many available materials which have been described heretofore as a source of carbon in steroid fermentation processes. Usually a variety of carbon sources can be employed in the medium with good results. Suitable sources of nitrogen include a number of the above named materials such as corn steep liquor, soya bean meal, cotton seed meal and various other substances such as beef extract, casein, yeast, enzymatically digested proteins, degradation products including peptones, amino acids and many other available proteinaceous materials which have been found to be suitable in supporting the growth of fungi. Inorganic sources of nitrogen include ammonium salts and nitrates which may also be used in the medium as a source of nitrogen to provide a favorable growth medium for the organism.

The mineral requirements of fermentation are usually supplied in the crude materials which are often used as sources of carbon and nitrogen or water that is used in the process. However, it may be advisable to supplement the minerals normally present with added amounts to obtain maximum growth. Cations and anions which may be desirable in added amounts include sodium, potassium, calcium, magnesium, phosphate, sulfate, chloride, cobalt, manganese and various others. The use of elements such as boron, copper, cobalt, molybdenum and chromium is often desirable.

The growth of the organism takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ½ to 2 volumes of air per volume of medium per minute. Agitation in the bottles or fermenter tanks is provided by mechanical impellers. It is preferable to carry out the process of the present invention at a temperature within the range of about 15° C. to about 37° C.

To obtain large working quantities of the culture *A. ochraceous*, the following method may be used. Seven flasks of a corn steep liquor-peptone-dextrose-salts medium, 100 ml. in 500 ml. flasks are inoculated with a spore suspension prepared from agar slant growth of *A. ochraceous*. The flasks are incubated at 28° C. on a rotary shaker, 250 r.p.m., 2″ diameter of rotation, for 64 hours. Ten percent transfers are than made to 12 2-liter flasks, each with 400 ml. of the same medium. After 24 hours of incubation as above, 240 mg. of a selected steroid dissolved in 8 ml. of methanol is added to each flask. Incubation is then continued for 30 hours at which time the flasks are harvested for extraction.

After the growth of the microorganism has taken place to some extent, the steroids are added to the fermentation in solution or finely divided form. One of the preferred methods is to dissolve the steroid in methanol or other water-miscible solvents and add it to the fermentation medium at the desired stage in the process. Although the steroid may precipitate from solution when so added, it is dispersed through the medium as a fine suspension and becomes readily available to the organism for oxidation. The amount of steroid added to the fermentation medium may vary considerably but is generally about $\frac{1}{10}$ to 1 gram per liter of medium.

During the fermentation process, it may be desirable to add anti-foaming agents such as silicones and glyceride oils. These compounds are added from time to time as needed. The fermentation is allowed to proceed for a period of time long enough to achieve maximum conversion of the steroid to the hydroxy product.

When maximum conversion to the hydroxy product is obtained, the desired hydroxylated steroid is recovered from the fermentation by extracting with ethyl acetate. The ethyl acetate extracts are concentrated under vacuum to a gum and the latter extracted with boiling hexane. Alternatively, the product obtained by fermentation with *A. ochraceus* is extracted a number of times, such as for example 3 times or more, with ethyl acetate and the combined extracts evaporated under vacuum. The residue is then slurried with hot acetone and filtered after a period of from ½ to 2 hours. A portion of the desired product is present as the filtered material and by evaporation of the filtrates additional product is obtained which may be recrystallized from alcohol if desired.

Product identification following fermentation is accomplished by chromatography in which a portion of the extract is spotted on filter paper. The paper is subjected to chromatography with a solvent mixture such as for example the Bush C. [i.e., Bush, Biochem. J. 50, 370, (1952)] solvent system, with detection being made by means of ultraviolet light absorption.

The method of the present invention and the products obtainable thereby will be more clearly understood by reference to the specific examples which follow:

Example I

Harvested fermentation broth (6 l.) obtained by the action of *A. ochraceus* NRRL 405 on 1.5 g. of *dl*-19-nortestosterone is extracted with an equal volume of ethyl acetate, then three times with half volume of ethyl acetate. The combined ethyl acetate extracts are concentrated under vacuum to about 50 ml. at which time solids precipitate. The solids weigh 275 mg. but contain no demonstrable amounts of steroids. The filtrate is chromatographed on 100 g. of silica gel, and benzene-ethyl acetate (7:3) elutes 100 mg. of crude *l*-10β,17β-dihydroxyestr-4-en-3-one which is recrystallized from acetone yielding the purified product, M.P. 214–218° C.; $[\alpha]_D$ —71.5°.

Example II

Continued elution of the silica gel column described in Example I above using benzene-ethyl acetate (7:3) affords mixed fractions containing 1β,17β-dihydroxyestr-4-en-3-one and 6β,17β-dihydroxyestr-4-en-3-one. Rechromatography of the mixed fractions on silica gel using ethyl acetate-methanol (17:3) for elution affords 0.5 mg. of pure 6β,17β-dihydroxyestr-4-en-3-one, M.P. 211–219° C.; $\lambda_{max}$ 238 mμ (ε 13,200).

Example III

Chromatography of the mixture from which 6β,17β-dihydroxyestr-4-en-3-one is recovered also yields the third component *l*-1β,17b-dihydroxyestr-4-en-3-one, 2.5 mg., M.P. 193–198° C.; $\lambda_{max}$ 243 mμ (ε 16,695).

Example IV

Continued elution of the silica gel column from which 10β,17β-dihydroxyestr-4-en-3-one and mixed fractions of 1β,17β- and 6β,17β-dihydroxyestr-4-en-3-ones are eluted gives, with benzene-ethyl acetate (3:2) and with pure ethyl acetate 280 mg. of purified 11α,17β-dihydroxyestr-4-en-3-one which was recrystallized three times from ethyl acetate and two times from acetone. The pure product thus obtained is characterized by its melting point 179–181° C. and specific rotation $[\alpha]_D$ —42.5° and shown to be identical with an authentic sample of 11α,17β-dihydroxyestr-4-en-3-one by infrared spectral comparisons.

Example V

Ten liters of harvested fermentation broth obtained by the action of *A. ochraceus* on 5.0 g. of *d*-19-nortestosterone is extracted with ethyl acetate, the extracts concentrated in vacuum, and the residue, weighing 3.1 g., M.P. 145–160° C., is recrystallized several times from ethyl acetate. Pure 11α,17β-dihydroxyestr-4-en-3-one, M.P. 167–170° C.; [α]_D −44.0° is thus obtained.

From the mother liquors after chromatography on florisil there is recovered 430 mg. of 11α-hydroxyestr-4-ene-3,17-dione. Recrystallization from ethyl acetate affords the pure sample, M.P. 200–209° C.; [α]_D −18.4° (in methanol).

*Example VI*

Fifty ml. of a medium containing yeast extract 1%, dextrose 1% and distilled water 100 ml. is inoculated with a spore suspension of *A. ochraceus* NRRL 405. The flask is shaken at 250 r.p.m. 28° C., for 66 hours, after which a 10% mycelial transfer is made to a flask of the medium described above. Following incubation for a 24 hour period, 15 mg. of 19-nortestosterone dissolved in 0.5 ml. of ethanol is added to the flask. An additional period of incubation with shaking is carried out for 23 hours at which time a 5 ml. sample is taken and extracted with 1 ml. methyl isobutyl ketone.

A sheet of No. 4 Whatman paper is spotted with the extract and the papergram run in the Bush C. solvent system [toluene-ethyl acetate-methanol-water (9:1:5:5)]. Examination of the papergram with an ultraviolet light revealed that two products, 11α-hydroxy-19-nortestosterone and 11α-hydroxyestr-4-ene-3,17-dione were formed and that the substrate was completely utilized.

*Example VII*

One liter flasks containing 200 ml. of the medium described in Example I are inoculated with a spore suspension of *A. ochraceus* NRRL 405 and incubated as noted above. Five percent transfers are made after 65 hours of growth to one and two liter flasks containing 200 and 400 ml. respectively of the same medium. The flasks are shaken at 250 r.p.m. at 26° and 28° C.

A total of 4.8 g. of *d*-19-nortestosterone in ethanol is added after 24 hours, 200 mg. in 5 ml. of solvent per 2 liter flask and half as much per liter flask. Incubation is continued as described above. Samples taken from representative flasks at 25 hours and processed as in Example I revealed two products, with complete utilization of substrate. All flasks are harvested for extraction at 28 hours.

While the compounds and method of the present invention have been described with some degree of particularity in the foregoing discussion and in the examples, it is to be understood that nothing contained therein is in any way to be construed as a limitation on the scope of this invention. The latter is to be limited only by the claims appended hereto.

The invention claimed is:

1. A process for preparing a compound of the formula:

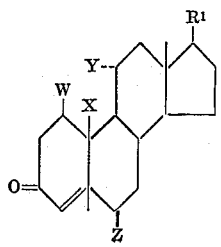

(II)

wherein $R^1$ is selected from the group consisting of OH and =O and one of the group of W, X, Y and Z is OH and the remainder of the group of W, X, Y and Z is H, with the proviso that when W or X is OH, the representation of structure of the product is a mirror image of II, which comprises, subjecting 19-nortestosterone to the action of *Aspergillus ochraceus* under oxidizing conditions and recovering the desired product selected from the group consisting of 1β,17β-dihydroxyestr-4-en-3-one; 6β,17β-dihydroxyestr-4-en-3-one; 10β,17β-dihydroxyestr-4-en-3-one; 11α,17β-dihydroxyestr-4-en-3-one; and 11α-hydroxyestr-4-ene-3,17-dione.

2. A process carried out according to claim 1 wherein the product is 10β,17β-dihydroxyestr-4-en-3-one.

3. A process carried out according to claim 1 wherein the product is 6β,17β-dihydroxyestr-4-en-3-one.

4. A process carried out according to claim 2 wherein the product is 1β,17β-dihydroxyestr-4-en-3-one.

5. A process carried out according to claim 2 wherein the product is 11α,17β-dihydroxyestr-4-en-3-one.

6. The method of resolving a racemic steroid of the formula

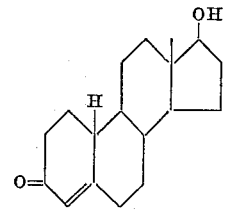

which comprises subjecting the racemic mixture to the fermentative action of *Aspergillus ochraceus* under oxidizing conditions and recovering a resolved product selected from the group consisting of *l*-10β,17β-dihydroxyestr-4-en-3-one; *d*-6β,17β-dihydroxyestr-4-en-3-one; *l*-1β,17β-dihydroxyestr-4-en-3-one; and *d*-11α,17β-dihydroxyestr-4-en-3-one.

7. The method according to claim 6 wherein the resolved product is *l*-10β,17β-dihydroxyestr-4-en-3-one.

8. The method according to claim 6 wherein the resolved product is *d*-6β,17β-dihydroxyestr-4-en-3-one.

9. The method according to claim 6 wherein the resolved product is *l*-1β,17β-dihydroxyestr-4-en-3-one.

10. The method according to claim 6 wherein the resolved product is *d*-11α,17β-dihydroxyestr-4-en-3-one.

References Cited by the Examiner

UNITED STATES PATENTS

| | | | |
|---|---|---|---|
| 2,756,244 | 7/1956 | Djerassi et al. | 260—397.4 |
| 2,759,951 | 8/1956 | Djerassi et al. | 260—397.4 |
| 2,802,775 | 8/1957 | Dulaney et al. | 195—51 |
| 2,905,593 | 9/1959 | Dulaney | 195—51 |
| 3,033,759 | 5/1962 | Wettstein et al. | 195—51 |
| 3,055,806 | 9/1962 | Wettstein et al. | 195—51 |

A. LOUIS MONACELL, *Primary Examiner.*

D. M. STEPHENS, *Assistant Examiner.*